United States Patent [19]

Seabury et al.

[11] Patent Number: 4,731,867
[45] Date of Patent: Mar. 15, 1988

[54] VEHICLE COMMUNICATION SYSTEM USING EXISTING ROADWAY LOOPS

[75] Inventors: Thomas W. Seabury, Diablo; Thomas Potter, Los Alamitos, both of Calif.

[73] Assignee: Detector Systems, Inc., Stanton, Calif.

[21] Appl. No.: 854,376

[22] Filed: Apr. 21, 1986

[51] Int. Cl.⁴ .............................................. H04B 5/00
[52] U.S. Cl. ...................................... 455/41; 455/55; 455/99; 340/941; 340/989
[58] Field of Search ...................... 455/41, 54, 55, 99, 455/228, 227; 340/47, 48, 941, 993, 989, 991; 379/55

[56] References Cited

U.S. PATENT DOCUMENTS

| | | | |
|---|---|---|---|
| 3,530,434 | 9/1970 | Stites et al. | 340/989 |
| 4,311,876 | 1/1982 | Endo et al. | 455/54 |
| 4,471,356 | 9/1984 | Gidl | 340/989 |

Primary Examiner—Robert L. Griffin
Assistant Examiner—Elissa Seidenglanz
Attorney, Agent, or Firm—Townsend & Townsend

[57] ABSTRACT

A method and system for transferring information between a moving vehicle and a stationary information location having a vehicle detector system with a loop antenna by using the loop antenna as either the receiving antenna for signals transmitted from a moving vehicle or as the transmitting antenna for signals generated by a transmitter located at the vehicle detector site for transfer to a receiver mounted on a moving vehicle. The information is encoded on a carrier having a frequency outside the normal frequency range of the vehicle detector system, preferably by interrupted carrier pattern processing.

14 Claims, 4 Drawing Figures

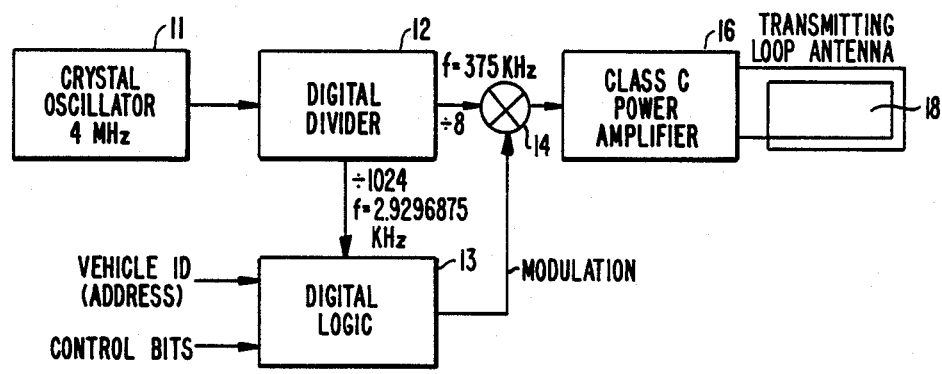
FIG._1.
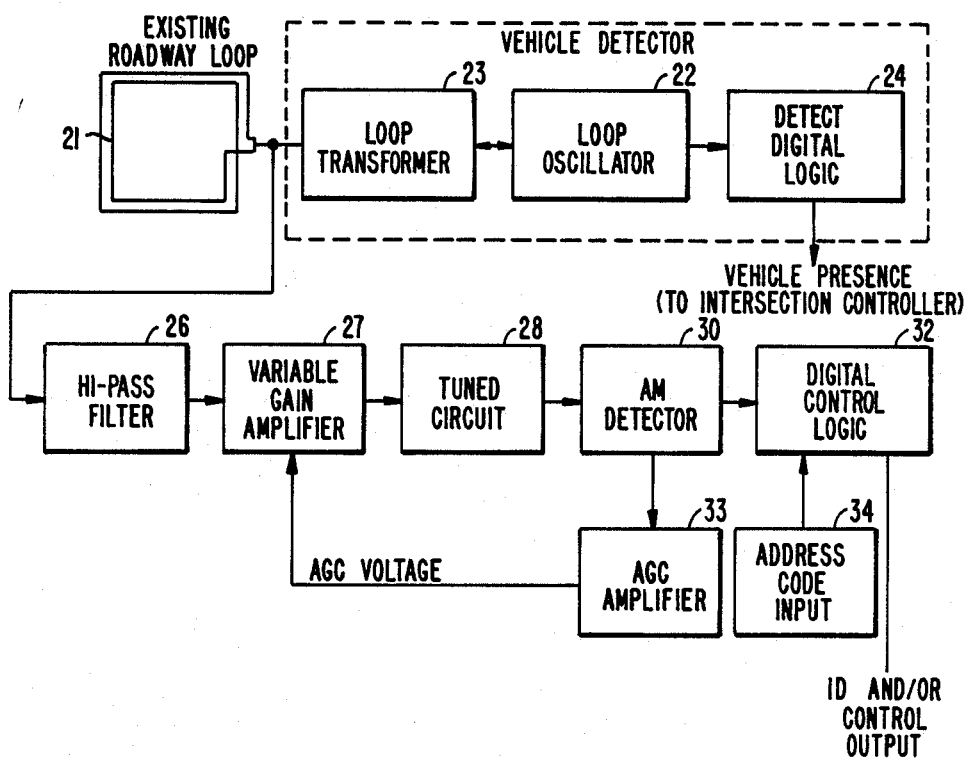
FIG._2.

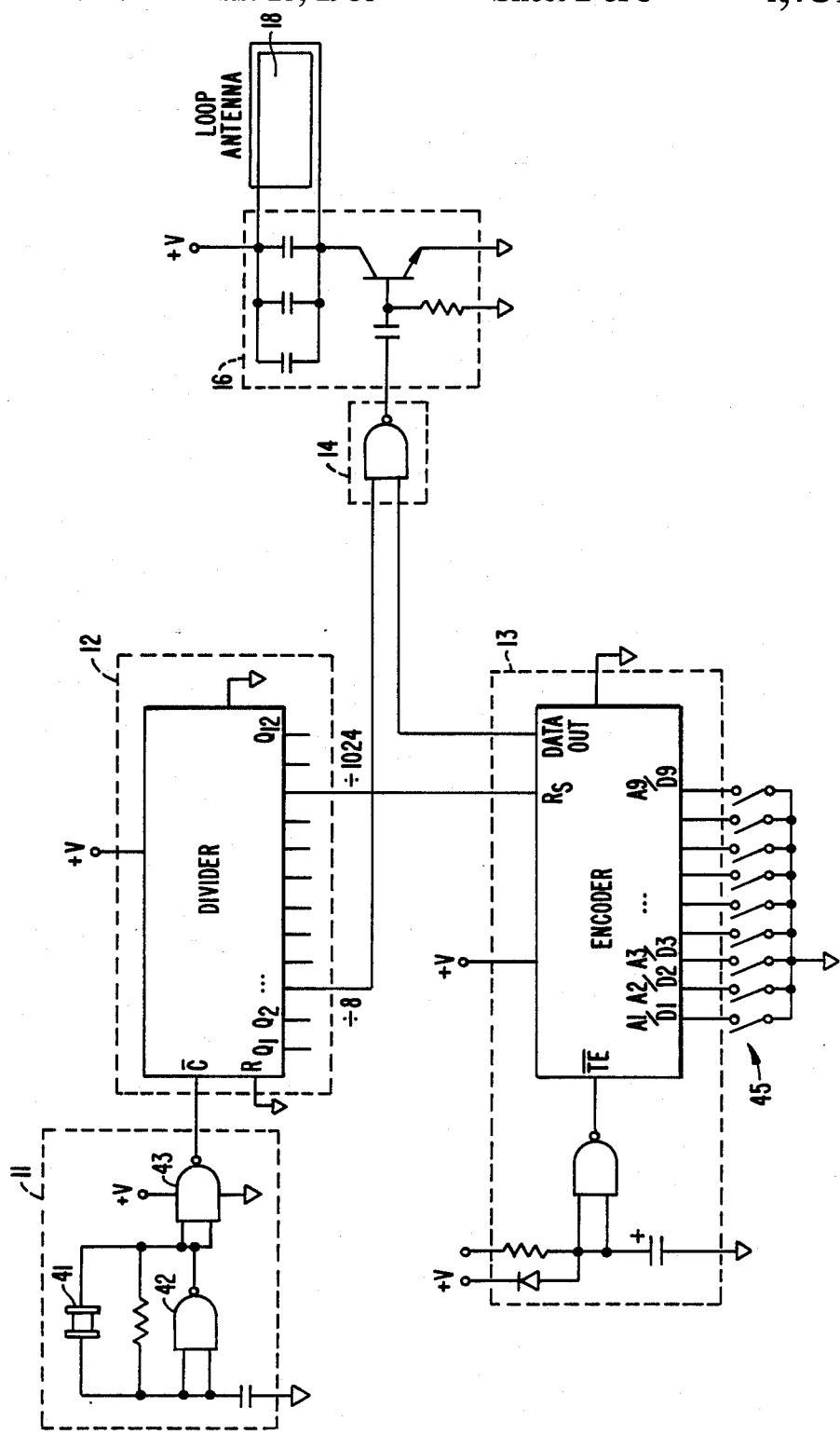
FIG._3.

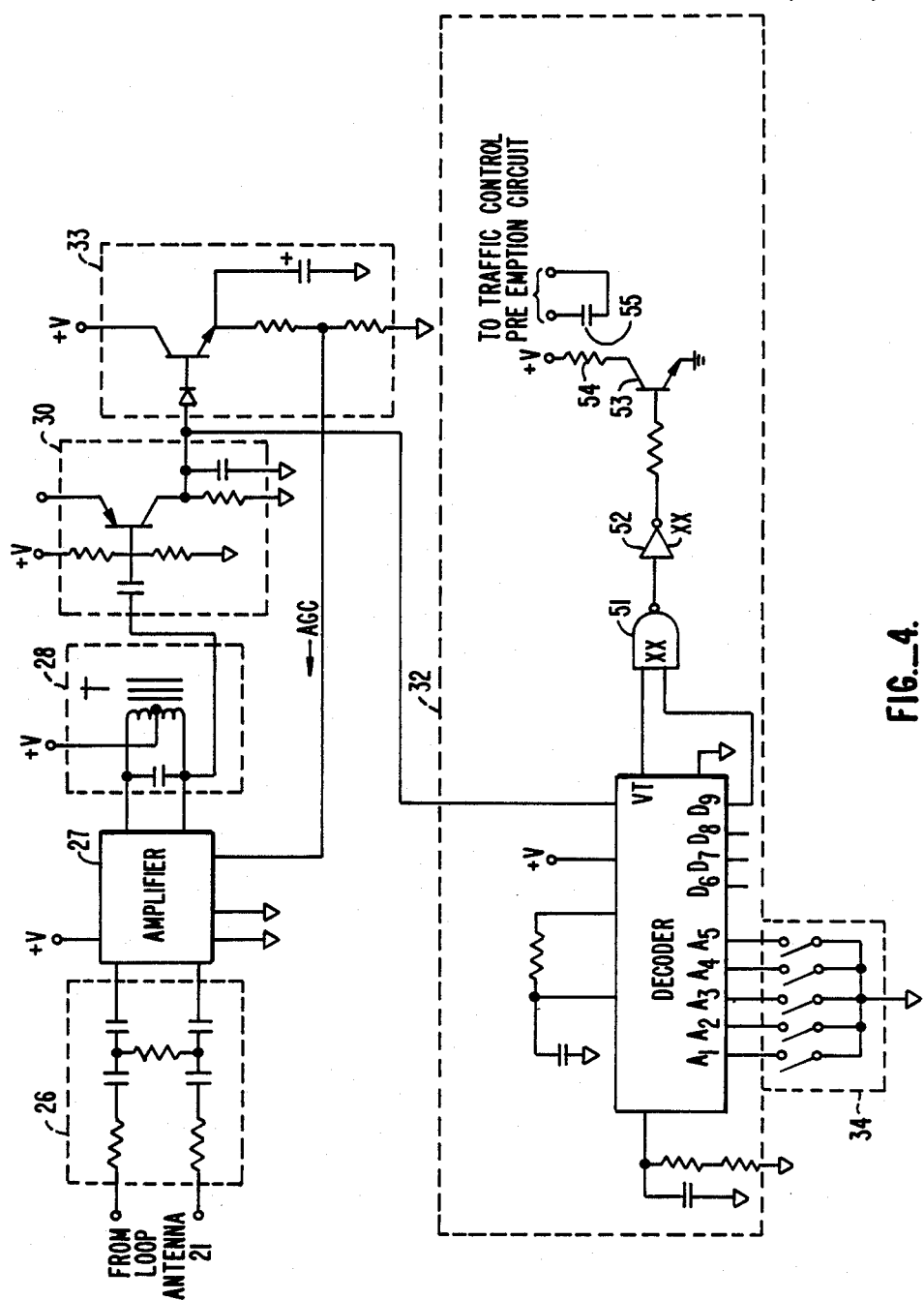
FIG._4.

VEHICLE COMMUNICATION SYSTEM USING EXISTING ROADWAY LOOPS

BACKGROUND OF THE INVENTION

This invention relates to communication systems for transferring information between a moving vehicle and a stationary location.

Systems are known which provide the capability of exchanging information between a stationary location and a moving vehicle, such as an automobile, truck, bus, emergency vehicle or a railroad car. Such systems typically employ either some type of modulated or encoded light radiation (such as the light based vehicle preemption system) or r.f. signals encoded with appropriate information and transmitted using appropriate transmitting and receiving antennae. An example of the latter type of communication system is described in U.S. Pat. No. 3,609,247 issued Sept. 28, 1971. Such known systems have been proposed for use, and in many cases actually used, in a wide variety of signalling applications. Examples of such applications are preempting the normal traffic intersection signal light control sequence in favor of an emergency vehicle (such as a fire truck, ambulance or police car); detecting the identity of railroad cars, buses and other vehicles passing a particular location; and a wide variety of other vehicle identification and control functions.

Aside from the expected technological difficulties in designing and implementing useful communication systems involving a stationary component and a moving component, perhaps the major deterrent factor to the wide spread implementation of vehicle-stationary location communication systems has been the cost of installing and maintaining the stationary location antenna element. The inductively coupled system shown in the above-referenced U.S. Pat. No. '247, for example, requires the installation of a specially designed coaxial trunk cable along the roadbed to enable the communication of information between the moving vehicle and the stationary sites. Other systems employ transmitting-/receiving antennae mounted in roadside boxes, which are not only costly to erect but also vulnerable to vandalism. Still other systems employ inductive loops permanently embedded in the roadbed or along the edge of the roadbed, which are specially designed for use in the communication system. Such embedded loop antennae are extremely costly to install, and the installation process usually results in the disruption of vehicular traffic and danger to the workmen performing the installation.

Efforts in the past to provide a vehicle communication system devoid of the above disadvantages have not met with success.

SUMMARY OF THE INVENTION

The invention comprises a system and method for affording communication between a moving vehicle and a stationary location which eliminates the requirement for a separate, dedicated antenna at the stationary site, while affording a wide range of communication and control functions between a moving vehicle and a stationary site.

The invention employs the loop antenna of any already installed vehicle detector system as the stationary site transmitting or receiving antenna, without interfering with the normal operation of the vehicle detector system.

From a system standpoint, the invention comprises a communication system for enabling transfer of information between a vehicle and a stationary information location, the system comprising a vehicle mounted transmitter or receiver means for enabling encoded carrier transmission or reception of preselected information signals over a relatively small range; and stationary receiver or transmitter means for receiving the information signals transmitted by the transmitter means or transmitting the information signals to the receiver means when within this relatively small range, the stationary receiver or transmitter means including the vehicle detector system loop antenna for sensing the transmitted signals. The vehicle mounted transmitter means preferably comprises means for generating an encoded carrier frequency signal lying within a transmitting frequency range different from the frequency range of the vehicle detector system loop signals; a transmitting antenna; and means coupled to the generating means and the transmitting antenna for amplifying the encoded carrier frequency signals.

The transmitter generating means preferably includes an oscillator, means for generating a carrier source signal, means for converting the carrier source signal to a carrier signal lying within the transmitting frequency range, and encoder means for imparting the preselected information signals to the carrier signal. The converting means may also include means for generating a clock signal for the encoder means for the carrier source signal.

The stationary receiver means includes means for distinguishing the preselected information signals from conventional vehicle detector signals present in the vehicle detector system loop antenna, the distinguishing means preferably including filter means having a signal pass band within the frequency range of the transmitted preselected information signals so that the conventional vehicle detector signals are rejected by the filter means. In a specific embodiment of the system in which the preselected information signals are generated at a predetermined frequency, the distinguishing means further includes an amplifier means coupled to the output of the filter means, a narrow band filter means for passing signals having the predetermined frequency, and detector means for converting those signals passing through the narrow band filter means to a signal form conformable with an associated control logic circuit. In one specific application of the system, the preselected information signals identify a traffic signal preemption vehicle, and in this specific embodiment the associated control logic circuit generates a traffic signal preemption enabling signal for the vehicle detector system in response to receipt of the preemption vehicle identification signals from the detector means.

From a method standpoint the invention includes the steps of encoding preselected information on a carrier signal having a frequency lying outside the frequency range of the loop signals in a vehicle detector system positioned at a stationary information location; using the vehicle detector system loop antenna as a receiving antenna for the encoded preselected information signals; and detecting the preselected information signals sensed by the vehicle detecting loop antenna while rejecting the vehicle detector system loop signals. The step of detecting the preselected information signals while rejecting the vehicle detector system loop signals includes the step of coupling the signals in the vehicle detecting system loop antenna to a filter having a pass band lying outside the frequency range of the vehicle detector system loop signals. When the step of encoding is performed at a specific frequency, the signals passed through the pass band filter are processed by the additional steps of amplifying those signals and narrow band filtering the amplified signals at the specific frequency.

By eliminating the requirement for a separate, dedicated stationary site antenna, the invention can be deployed at relatively low cost and relatively quickly wherever a functional vehicle detector system loop antenna can be found. In addition, since loop detectors are always installed in association with other electronic circuitry, the stationary site circuitry employed with the invention can simply be included in the same housing or in a housing adjacent to the vehicle detector circuitry.

For a fuller understanding for the nature and advantages of the invention, reference should be had to the ensuing detailed description taken in conjunction with the accompanying drawings.

BRIEF DESCRIPTION OF THE DRAWINGS

FIG. 1 is a block diagram of a transmitter portion of a system incorporating the invention;

FIG. 2 is a block diagram of a receiver portion of a system incorporating the invention;

FIG. 3 is a circuit diagram of a specific embodiment of the transmitter of FIG. 1; and FIG. 4 is a circuit diagram of a specific embodiment of the receiver of FIG. 2.

DESCRIPTION OF THE PREFERRED EMBODIMENT

Turning now the drawings, FIGS. 1 and 2 illustrate, respectively, a transmitter and a receiver portion of a system embodying the invention. In the transmitter shown in FIG. 1 in block diagram form, a carrier source signal, illustrated as a crystal controlled oscillator 11 generates a carrier source signal which is coupled to the input of a digital divider 12. Divider 12 divides down the input signal to a transmit carrier frequency signal of predetermined value (375 KHz in the preferred embodiment).

A digital logic circuit 13 accepts preselected information in digital form and converts this information to a modulation signal, which is coupled to a summing circuit 14. The divider 12 also provides a clock signal for the digital logic circuit 13.

The modulated carrier signal output from the summing circuit 14 is amplified in a power amplifier circuit 16 and coupled to a transmitting loop antenna.

The information input to the digital logic circuit 13 is illustrated as a vehicle identification number and digital control information (labelled control bits). The vehicle identification number may be unique to a specific vehicle (for example in an application in which the object is to monitor the passage of specific vehicles through a checkpoint), or the vehicle identification may be that of a special class of vehicles (such as ambulances in a given urban area, when used in a preemption application). The control bit information may serve to identify the type of information being supplied (e.g., the vehicle identification number, a preemption request, an identification of the address data as an odometer reading, or any other suitable control function).

The transmitting power for the transmitter of FIG. 1 should be relatively low so that the signal will have a relatively small range, on the order of five feet. The use of relatively low transmitting power ensures that the transmitted signal will not interfere with any other r.f. signals in the region of the vehicle. In addition, to further shield the transmitted signals from interfering with other electromagnetic radiation, the transmitting loop antenna 18 is preferably mounted on the underside of a vehicle (e.g., underneath the front bumper). In one particular embodiment, the transmitting loop antenna 18 comprises a four turn coil mounted on a six inch by nine inch printed circuit board encapsulated in plastic or some other suitable protective material.

With reference to FIG. 2, the receiver at the stationary information site is coupled to an existing vehicle detector loop antenna 21. The conventional vehicle detector system shown in the upper portion of FIG. 2 includes a loop oscillator 22 which is normally tuned to a resonant frequency using a fixed capacitive element. The oscillator 22 is coupled by means of a loop transformer 23 to the loop antenna 21. Antenna 21 consists of one or more turns of wire installed in relieved portions of the roadway at an appropriate location (such as an intersection, a driveway entrance, a driveway exit or the like). The area of the loop antenna 21 is chosen to cover the area of the roadway where the presence of a vehicle is to be detected.

A typical vehicle detector system such as that illustrated in FIG. 2 operates on the principle of monitoring the resonant frequency of the loop network. This is accomplished by providing an excitation voltage to the loop and monitoring the loop for frequency changes. The presence of a metal body, (such as an automobile) in the area of the loop 21 causes the inductance of the loop to decrease over the inductance value when a metal body is absent. This decrease in inductance causes the resonant frequency of the oscillator 22 to increase. A digital logic circuit 24 measures any change in the frequency of the loop oscillator 22 and generates a vehicle presence signal whenever the frequency has changed by a preselected amount. This vehicle presence signal is then coupled to follow-on digital electronic devices, such as an intersection controller used to control the timing of intersection signal lights, an entrance gate or an exit gate (or both) from a parking lot, and other applications.

Vehicle detector systems are designed to oscillate over a relatively wide range of frequencies, depending on several different parameters, such as loop configuration, cable lengths, and other parameters. Typically, the range of operating frequencies lies between about 20 KHz and 150 KHz; and the loop 21 always contains signals lying somewhere within this typical frequency range whenever the system is active.

In order to be able to use the existing roadway loop 21 in the system according to the invention, two basic requirements must be met. First, the transmission frequency of the communication system must lie outside the range of frequencies in the vehicle detector loop 21; secondly, the receiver must be able to distinguish between the vehicle detector loop signals and the transmitted information signals generated by the FIG. 1 transmitter and coupled to the roadway loop 21 by loop antenna 18 whenever the vehicle moves through the vehicle detector site.

The first requirement is met in the communication system of the invention by selecting a carrier frequency which is either substantially below or substantially above the expected range of vehicle detector loop frequencies. In the preferred embodiment, the transmitter carrier frequency is selected to be higher than the highest frequency encountered with known vehicle detector loop systems. Specifically, a frequency of 375 KHz is employed in the actual embodiment. As will be appreciated by those skilled in the art, this is substantially above the normal high frequency end of the vehicle detector loop frequency spectrum (150 KHz).

As shown in FIG. 2, the vehicle detector loop antenna 21 is coupled to the input of a high pass filter 26. This filter rejects signals having a frequency lying within the frequency of the loop detector signals. With the transmitting carrier frequency chosen (i.e., 375 KHz), the low frequency cut-off characteristics high pass filter 26 are not exceedingly critical. Nonetheless, a filter design should be selected which ensures that any signal having a frequency lower than about 50 KHz should be attenuated by a factor of 6 db. The signals output from the high pass filter 26 are coupled to the input of an amplifier 27, illustrated as a variable gain amplifier, and the signals output from the amplifier 27 are coupled to the input of a tuned circuit 28. The purpose of the tuned circuit 28 is to provide additional narrow band filtering to substantially reject all signals having frequencies other than the carrier frequency of 375 KHz.

The output of the tuned circuit 28 is coupled to the input of an AM detector 30, which demodulates the carrier to recapture the original digitally encoded information. This digitally encoded information is then coupled to the input of a digital control logic circuit 32, where it is processed.

The receiver embodiment illustrated in FIG. 2 is provided with a conventional automatic gain control circuit including an AGC amplifier 33 which develops a feedback voltage for the variable gain amplifier 27. In some applications, such an automatic gain control feature can be useful in compensating for input signals varying over a relatively wide range, such as 50 db. Specifically, the automatic gain control feature prevents the overloading of the detector 30 and provides nearly constant signal strength once the vehicle antenna 18 is over the roadway loop antenna 21. In other applications, the automatic gain control feature may not be necessary and may be deleted.

FIGS. 3 and 4 illustrate a specific embodiment, respectively, of the vehicle mounted transmitter and the stationary receiver. With reference to FIG. 3, the transmitter includes a 4 MHz crystal 41 and a pair of NAND gates 42, 43 which provide the 4 MHz crystal controlled carrier source signal to the clock input of a CMOS type 4040 divider circuit. The divider circuit 12 provides a first carrier frequency output signal of 375 KHz, which is coupled as one input to a NAND gate comprising summing circuit 14. A second clock signal is coupled from the divider 12 to the clock input of an encoder circuit, which preferably comprises a Motorola type MC 145026 encoder. The transmit enable input to the encoder 13 is always active in the FIG. 3 circuit.

A plurality of address input switches designated generally with reference numeral 45 are set to a predetermined address configuration. In the preferred embodiment, only the first five switches counting from the left are used to provide the address information to specifically identify the vehicle bearing this transmitter. The encoder output is coupled as a second input to the NAND gate comprising the multiplier circuit 14. The output of circuit 14, as noted in the description of FIG. 1, is amplified by amplifier 16 and coupled to the vehicle mounted loop antenna 18.

With reference to FIG. 4, the roadway loop antenna 21 is coupled to high pass filter circuit 26, consisting of two parallel branches each having a 27K ohm input resistance and a pair of 50 picofarad capacitors coupled as shown. A 12K ohm resistor joins the two parallel branches in the manner indicated. The output of the high pass filter 26 is coupled to the input of amplifier 27, which preferably comprises a Motorola type MC1350 high frequency (video) amplifier. The output of the amplifier is coupled to the input of tuned circuit 28, which consists of a center tapped transformer with an inductance of 0.36 mH and a 500 picofarad capacitor connected as shown.

The output of tuned circuit 28 is coupled to the input of the detector 30, consisting of a 50 pico farad input capacitor, a biasing network comprising a 12K ohm (upper) and 300K ohm (lower) resistor, a type 2N3906 transistor and an RC grounded network consisting of a 12K ohm resistor and a 1500 picofarad capacitor. The output of detector 30 is coupled via a type 1N914 diode to the base input of a type 2N3904 transistor forming part of the AGC amplifier circuit 33. The feedback signal to amplifier 27 is taken from the junction of a 4.7K ohm (upper) and 12K ohm resistor network. A 10 micro farad capacitor couples the emmitter electrode of the transistor to ground.

The output of detector 30 is coupled to the data input of a Motorola type MC145027 decoder. The first five bits of the serially appearing information are compared with the address/data inputs conditioned by the switches in the address code input unit 34. When the first five incoming binary bits match the switch settings over a double scanned sequence, the VT (valid transmission) output and the D9 data output from the decoder enable a NAND gate 51, the output of which is inverted by an inverter 52 and used to turn on a power transistor 53 which pulls a relay coil 54, thereby closing a pair of relay contacts 55. The relay contacts are coupled to a traffic control preemption circuit, which initiates the proper control operation to perform signal preemption.

The encoding technique employed in the preferred embodiment is an interrupted carrier pattern encoding method in which the single frequency carrier is turned on to indicate one binary state and turned off to indicate the other binary state. The potential on time or off time of a given bit period is specified for the system, and an appropriate number of bit periods is used to designate a multi-bit digital character. In the specific embodiment, a nine bit digital character is used: five bits for address information and four bits for control information. Other sized multi-bit characters may be employed and the number of bits assigned to address information and control information may be varied, as desired.

It should be understood that the preemption example illustrated in FIGS. 3 and 4 is by way of example only, and that there are many applications of the invention. Such applications include unique identification of a given vehicle in a fleet (such as a truck fleet); the identification of a class of vehicles (such as ambulances from a given metropolitan area, or a regional area); the identification of emergency vehicles in general (lumped together as a group) and other variations. In addition, the invention may be used to supply data from the vehicle to the stationary site, which data may take on a wide number of different forms. For example, the data may identify the odometer setting of a rental car which has been returned to the rental agency parking lot. Such an identification can be made by using some of the switches 45 to identify the type of information (i.e., odometer setting), and the remaining switches to specify the actual data (i.e., mileage). The switches associated to the decoder would be correspondingly set to the same i.d. number (i.e., information type), and the outputs of the remaining data terminals would supply the actual data. As will be appreciated by those skilled in the art, the number of applications is only limited by the need for various types of information to be exchanged between a moving vehicle and a stationary site.

While the above provides a full and complete disclosure of the preferred embodiment of the invention, various modifications, alternate constructions and equivalents will occur to those skilled in the art. For example, although specific circuitry has been described, other equivalent circuits may be employed, as desired. In addition, while the system has been described as employing a transmitter on the moving vehicle and a receiver at the stationary location, the location of these units may be reversed so that the moving vehicle carries the receiving apparatus coupled to the moving vehicle antenna 18, while the stationary site has the transmitter, with the output of amplifier 16 coupled to the roadway loop antenna 21. Therefore, the above descriptions and illustrations should not be construed as limiting the scope of the invention which is defined by the appended claims.

What is claimed is:

1. A communication system for enabling transfer of information between a vehicle and a stationary information location, said system comprising:
   a vehicle mounted transmitter means for enabling transmission of preselected information signals over a relatively small range; and
   stationary receiver means for receiving said information signals transmitted by said transmitter means when within said range,
   said transmitter means including means for generating an encoded carrier frequency signal lying within a transmitting frequency range different from the frequency range of the vehicle detector system loop signals and containing said preselected information signals,
   said receiver means including a vehicle detector system loop antenna and means for distinguishing said preselected information signals from conventional vehicle detector signals present in said vehicle detector system loop antenna.

2. The invention of claim 1 wherein said distinguishing means includes filter means having a signal pass band within the frequency range of said preselected information signals so that said conventional vehicle detector signals are rejected by said filter means.

3. The invention of claim 2 wherein said preselected information signals are generated at a predetermined frequency outside the frequency range of said conventional vehicle detector signals, and wherein said distinguishing means further includes amplifier means coupled to the output of said filter means, a narrow band filter means for passing signals having said predetermined frequency, and detector means for converting those signals passing through said narrow band filter means to a signal form conformable with an associated control logic circuit.

4. The invention of claim 3 wherein said preselected information signals identify a traffic signal preemption vehicle, and wherein the associated control logic circuit generates a traffic signal preemption enabling signal for the vehicle detecting system in response to receipt of said preemption vehicle identification signals from said detector means.

5. For use in a communication system for enabling transfer of information between a vehicle and a receiver located at a vehicle detector system location and coupled to a vehicle detector loop antenna, a vehicle mounted transmitter means for enabling encoded carrier transmission of preselected information signals over a relatively small range, said transmitter means comprising means for generating an encoded carrier frequency signal lying within a transmitting frequency range different from the frequency range of the vehicle detector system loop signals and containing preselected information signals, a transmitting antenna, and means coupled to said generating means and said transmitting antenna for amplifying said encoded carrier frequency signals.

6. The invention of claim 5 wherein said generating means includes an oscillator means for generating a carrier source signal, divider means for converting said carrier source signal to a carrier signal lying within said transmitting frequency range, and encoder means for imparting said preselected information signals to said carrier signal.

7. The invention of claim 6 wherein said divider means includes means for generating a clock signal for said encoder means from said carrier source signal.

8. The invention of claim 6 wherein said oscillator means comprises a crystal controlled oscillator.

9. For use in a communication system for enabling transfer of information between a stationary location having a vehicle detector system with a loop antenna and a vehicle having a transmitter for generating preselected information signals as encoded carrier signals lying within a transmitting frequency range different from the frequency range of the vehicle detector system loop signals; a receiver for converting preselected information signals sensed by the vehicle detector system loop antenna to control signals representative of said preselected information signals, said receiver comprising filter means adapted to be coupled to the vehicle detector loop antenna for distinguishing said preselected information signals from conventional vehicle detector signals present in said loop antenna, and detector means for converting those signals distinguished by said filter means to a signal form conformable with an associated control logic circuit.

10. The invention of claim 9 wherein said receiver further includes amplifier means coupled to the output of said filter means, and narrow band filter means coupled between said amplifier means and said detector means for passing signals having said predetermined frequency.

11. A method of transferring preselected information between a moving vehicle and a stationary information location having a vehicle detector system with a loop antenna, said method comprising the steps of:
   (a) encoding said preselected information on a carrier signal having a frequency lying outside the frequency range of the vehicle detector system loop signals;
   (b) transmitting the signal resulting from said step (a) of encoding from the moving vehicle;

(c) using the vehicle detector system loop antenna as a receiving antenna for the signal transmitted in step (b); and (d) detecting the preselected information signals sensed in step (c) by the vehicle detect or system loop antenna while rejecting the vehicle detect or system loop signals.

12. The method of claim 11 wherein said step (d) includes the step of coupling the signals in the vehicle detecting system loop antenna to a filter having a pass band lying outside the frequency range of the vehicle detector system signals.

13. The method of claim 12 wherein said step (a) of encoding is performed at a specific frequency; and wherein said step of coupling is followed by the steps of amplifying the signals appearing at the output of the pass band filter, and narrow band filtering the amplified signals at said specific frequency.

14. The method of claim 11 wherein said step (a) of encoding includes the step of interrupting said carrier signal for a preselected time period to indicate a binary bit.

* * * * *